United States Patent
Racape et al.

(10) Patent No.: US 11,363,254 B2
(45) Date of Patent: *Jun. 14, 2022

(54) METHOD FOR IMPROVED INTRA PREDICTION WHEN REFERENCE SAMPLES ARE MISSING

(71) Applicant: INTERDIGITAL VC HOLDINGS, INC., Wilmington, DE (US)

(72) Inventors: Fabien Racape, San Francisco, CA (US); Franck Galpin, Cesson-Sevigne (FR); Tangi Poirier, Cesson-Sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/015,456

(22) Filed: Sep. 9, 2020

(65) Prior Publication Data
US 2020/0413041 A1 Dec. 31, 2020

Related U.S. Application Data

(63) Continuation of application No. 16/336,228, filed as application No. PCT/EP2017/073494 on Sep. 18, 2017, now Pat. No. 10,834,387.

(30) Foreign Application Priority Data

Sep. 27, 2016 (EP) .................................... 16306238

(51) Int. Cl.
H04N 19/11 (2014.01)
H04N 19/159 (2014.01)
(Continued)

(52) U.S. Cl.
CPC .......... H04N 19/105 (2014.11); H04N 19/11 (2014.11); H04N 19/132 (2014.11);
(Continued)

(58) Field of Classification Search
CPC ..... H04N 19/105; H04N 19/11; H04N 19/132
See application file for complete search history.

(56) References Cited

U.S. PATENT DOCUMENTS 10,460,513 B2 * 10/2019 Nijasure ................. G06T 15/80
10,547,838 B2 * 1/2020 Andersson ............. H04N 19/17
(Continued)

FOREIGN PATENT DOCUMENTS

WO    WO2016066093    5/2016

OTHER PUBLICATIONS

Tsai, et al., Intensity Gradient Technique for Efficient Intra-Prediction in H.264/AVC, iEEE Transactions on Circuits and Systems for Video Technology, Institute of Electrical and Electronics Engineers, US, vol. 18, No. 5, May 1, 2008, pp. 694-698.
(Continued)

Primary Examiner — Irfan Habib
(74) Attorney, Agent, or Firm — Ronald Kolczynski

(57) ABSTRACT

The method for intra frame prediction allows for the recovery of some intra directional modes that are otherwise rendered useless due to the classical padding process. Directional modes are recovered by filling pixel locations in the prediction unit with samples from the portion of the unit that is determined to have samples available for use using a counterpart directional mode to the one that is useless. When it is determined that reference samples are missing for a particular prediction unit or portion thereof given a particular directional mode, a determination is made about whether reference samples along another portion of the prediction unit are available. The other portion is the side of the
(Continued)

prediction unit at an opposite end of the particular directional mode. When it is determined that such reference samples are available, it is possible to extend the number of intra directional modes by replacing the particular directional modes that are rendered useless, because of the unavailability of reference samples, with their counterpart directional modes that are oppositely directed.

12 Claims, 8 Drawing Sheets

(51) Int. Cl.
  *H04N 19/176* (2014.01)
  *H04N 19/105* (2014.01)
  *H04N 19/132* (2014.01)
  *H04N 19/593* (2014.01)
  *H04N 19/182* (2014.01)

(52) U.S. Cl.
  CPC ......... *H04N 19/159* (2014.11); *H04N 19/176* (2014.11); *H04N 19/182* (2014.11); *H04N 19/593* (2014.11)

(56) References Cited

U.S. PATENT DOCUMENTS

| | | | |
|---|---|---|---|
| 10,554,977 B2 * | 2/2020 | Fu | H04N 19/13 |
| 2008/0012991 A1 * | 1/2008 | Wang | H04N 5/142 |
| | | | 348/625 |
| 2011/0293001 A1 * | 12/2011 | Lim | H04N 19/14 |
| | | | 375/240.12 |
| 2013/0128961 A1 | 5/2013 | Kim et al. | |
| 2013/0271565 A1 * | 10/2013 | Chen | H04N 13/161 |
| | | | 348/43 |
| 2013/0301715 A1 * | 11/2013 | Lin | H04N 19/593 |
| | | | 375/240.12 |
| 2014/0233642 A1 * | 8/2014 | Lin | H04N 19/176 |
| | | | 375/240.12 |
| 2015/0124880 A1 | 5/2015 | Kim et al. | |
| 2015/0222908 A1 * | 8/2015 | Oh | H04N 19/109 |
| | | | 375/240.03 |
| 2015/0271503 A1 | 9/2015 | Jeon et al. | |
| 2016/0057430 A1 | 2/2016 | Kolesnikov et al. | |
| 2017/0013269 A1 * | 1/2017 | Kim | G06T 1/20 |

OTHER PUBLICATIONS

Weigand, Overview of the H.264/AVC Video Coding Standard, IEEE Transactions on Circuits and Systems for Video Technology, Institute of Electrical and Electronics Engineers, US, vol. 13, No. 7, Jul. 1, 2003 pp. 560-576.
Lin et al., CE4 Subset2: Report of Intra Coding Improvements for Slice Boundary Blocks, Joint Collaborative Team on Video Coding (JCT-VC)of ITU-T SG16 WP3 and ISO/IEC JTC1/SC29/WG11 5th Meeting: Geneva, Mar. 16-23, 2011, [JCTVC-E283], JCTVC-E283 (version 2), Mar. 16, 2011, JCTVC-E283-v2.zip: JCTVC-E283_r1.docx: pp. 1-6.

* cited by examiner

METHOD FOR IMPROVED INTRA PREDICTION WHEN REFERENCE SAMPLES ARE MISSING

FIELD OF THE INVENTION

This invention relates to digital video compression and, more particularly, to a method for improved intra prediction in the absence of neighboring reference samples required for the intra prediction.

BACKGROUND OF THE INVENTION

Digital video compression technology is replete with a number of technical standards and competing techniques. For example, there are the following exemplary techniques:

High Efficiency Video Coding (HEVC), also known as H.265 and MPEG-H Part 2, published in 2014 as ITU-T, High Efficiency Video Coding (HEVC), Recommendation ITU-T H.265|International Standard ISO/IEC 23008-2;

Advanced Video Coding (AVC), also known as H.264 or MPEG-4 Part 10, published in 2002 as ITU-T, Rec. H264|ISO/IEC 14496-10 AVC (MPEG-4); and VP9, which is said to be an open video compression format presently in development by a Google partnership, described in a submission by A. Grange et al. that was entitled "*A VP9 Bitstream Overview draft-grange-vp9-bitstream-00*" and made to the IETF Network Working Group on Feb. 18, 2013 (XP015090122).

Each of the digital video compression techniques involves the use of intra-frame prediction, commonly expressed as intra prediction. Intra prediction can be described in quite generalized terms as involving: filling a neighboring shape of reference samples that are either previously decoded or reconstructed samples that are currently available or padded samples when decoded/reconstructed samples are unavailable; and then propagating these reference samples within the neighboring shape according to the intra prediction directional mode in use. In such a prediction process, the intra prediction directional modes propagate neighboring pixels to predict a current block, which is also known as a Prediction Unit (PU).

Since intra frame prediction relies on previously decoded samples (pixels) around the current, some samples from neighbors may not be available for use as reference samples. The absence or unavailability of such samples can occur because of image borders, quad-tree structure, and scanning order of blocks, inter alia. Generally, pixel padding is performed to fill those block locations for which samples are not available. When the expected reference samples are unavailable in HEVC, for instance, the prediction process continues by copying the value of the closest available reference sample onto the locations for which the expected reference samples are otherwise missing or unavailable. In this way, all the intra direction modes are available since the entire reference pixel zone is filled with previously decoded pixels and padded pixels.

When an entire side of reference samples is missing, as depicted in the left image of FIG. 1, all the reference samples are then destined to have the same value. This, in turn, leads to an intra prediction process that has useless directional modes.

FIG. 1 shows a stage of prediction for a block (i.e., prediction unit PU) where pixels on the left side are missing. In this case, all those pixels are assigned the value of the first available pixel when scanning the reference pixel L-shape from bottom left to top right, as depicted on the right side of FIG. 1. In the case of the HEVC standard, the directional modes ranging from 2 to 9, which are shown in FIG. 1, are rendered substantially useless because all the reference pixels being employed will have the same value. In the same manner as for modes 2 through 9, directional modes 27 to 34 shown in FIG. 1 are rendered substantially useless when the neighbors above are not available.

If one were to employ any of the above-identified directional modes in the prediction process, it would be effectively akin to the using DC mode in one sense because all the pixels in the current block (or PU) will be assigned the same reference value, except that the assigned value for these pixels is not the average value from a set of reference pixels but is instead the padded value as shown in FIG. 1. Nonetheless, application of any of these directional modes leads to the same result, namely, that they are rendered useless and ineffective for accurate intra prediction.

SUMMARY OF THE INVENTION

By utilizing the teachings for the methods disclosed herein, it is possible to recover some intra directional modes that are otherwise rendered useless due to the classical padding process. In accordance with an aspect of the invention, directional modes are recovered by filling pixel locations in the prediction unit with samples from the portion of the unit that is determined to have samples available for use. In certain cases, reference samples may still be missing or unavailable for use, but padding in accordance with the principles of the present method will employ better pixel values corresponding to the considered intra directional mode.

When it is determined that reference samples are unavailable or missing for a particular prediction unit or portion thereof given a particular directional mode, a determination is made about whether reference sample(s) (pixel(s)) along another portion of the prediction unit are available, wherein the other portion is the side of the prediction unit at an opposite end of the particular directional mode. When it is determined that such reference samples are available, it is possible to extend the number of intra directional modes by replacing the particular directional modes that are rendered useless (because of the unavailability of reference samples) with their counterpart directional modes that are oppositely directed.

In another embodiment, it is possible to avoid increased data overhead from an additional syntax or the like by detecting the absence of reference samples on an entire side in order to infer the need to switch from a particular directional mode to its oppositely directed counterpart directional mode.

In another embodiment, a method is provided for compression of digital video images including an operation for intra frame prediction, each said digital video image including one or more prediction units, wherein said intra frame prediction comprises determining whether one or more reference samples are unavailable or missing for a prediction unit or portion thereof given a particular directional mode. If it is determined that one or more reference samples are unavailable or missing, the method further comprises determining whether one or more reference samples are available along another portion of the prediction unit, wherein the another portion of the prediction unit is along a side of the prediction unit at an opposite end of the particular directional mode. If it is determined that one or more reference samples are available at the opposite ends of the particular directional mode, the method further comprises replacing the particular directional mode with a counterpart directional mode that is oppositely directed to the particular directional mode, and filling the prediction unit with the available reference samples using the counterpart directional mode.

In another embodiment, an apparatus is provided for compression of digital video images, each said digital video image including one or more prediction units, the apparatus comprising: a memory that stores a plurality of instructions; and a processor coupled to the memory and configured to perform said video image compression including an operation for intra frame prediction. The processor is configured to perform said intra frame prediction by: determining whether one or more reference samples are unavailable or missing for a prediction unit or portion thereof given a particular directional mode. If it is determined that one or more reference samples are unavailable or missing, determining whether one or more reference samples are available along another portion of the prediction unit, wherein the another portion of the prediction unit is along a side of the prediction unit at an opposite end of the particular directional mode. If it is determined that one or more reference samples are available at the opposite ends of the particular directional mode, replacing the particular directional mode with a counterpart directional mode that is oppositely directed to the particular directional mode, and filling the prediction unit with the available reference samples using the counterpart directional mode.

In another embodiment, there is provided a nontransitory computer readable medium having one or more executable instructions stored thereon, which when executed by a processor cause the processor to perform a method for compression of digital video images including an operation for intra frame prediction, each said digital video image including one or more prediction units. The intra frame prediction comprises: determining whether one or more reference samples are unavailable or missing for a prediction unit or portion thereof given a particular directional mode. If it is determined that one or more reference samples are unavailable or missing, determining whether one or more reference samples are available along another portion of the prediction unit, wherein the another portion of the prediction unit is along a side of the prediction unit at an opposite end of the particular directional mode. If it is determined that one or more reference samples are available at the opposite ends of the particular directional mode, replacing the particular directional mode with a counterpart directional mode that is oppositely directed to the particular directional mode, and filling the prediction unit with the available reference samples using the counterpart directional mode.

In another embodiment, there is provided an apparatus for transmitting a video image block, comprising: a memory and a processor. The processor is configured to perform a method for compression of digital video images including an operation for intra frame prediction, each said digital video image including one or more prediction units. The intra frame prediction comprises determining whether one or more reference samples are unavailable or missing for a prediction unit or portion thereof given a particular directional mode. If it is determined that one or more reference samples are unavailable or missing, determining whether one or more reference samples are available along another portion of the prediction unit, wherein the another portion of the prediction unit is along a side of the prediction unit at an opposite end of the particular directional mode. If it is determined that one or more reference samples are available at the opposite ends of the particular directional mode, replacing the particular directional mode with a counterpart directional mode that is oppositely directed to the particular directional mode, and filling the prediction unit with the available reference samples using the counterpart directional mode.

It should be understood by persons skilled in the art that the present method improves intra prediction over the prior art techniques in those cases where reference samples are missing or unavailable for use and where the best directional mode of propagation for a prediction unit is not covered by classical padding of unavailable samples.

BRIEF DESCRIPTION OF THE DRAWINGS

The teachings of the present invention can be readily understood by considering the following detailed description in conjunction with the accompanying drawings, in which.

Figure 1:
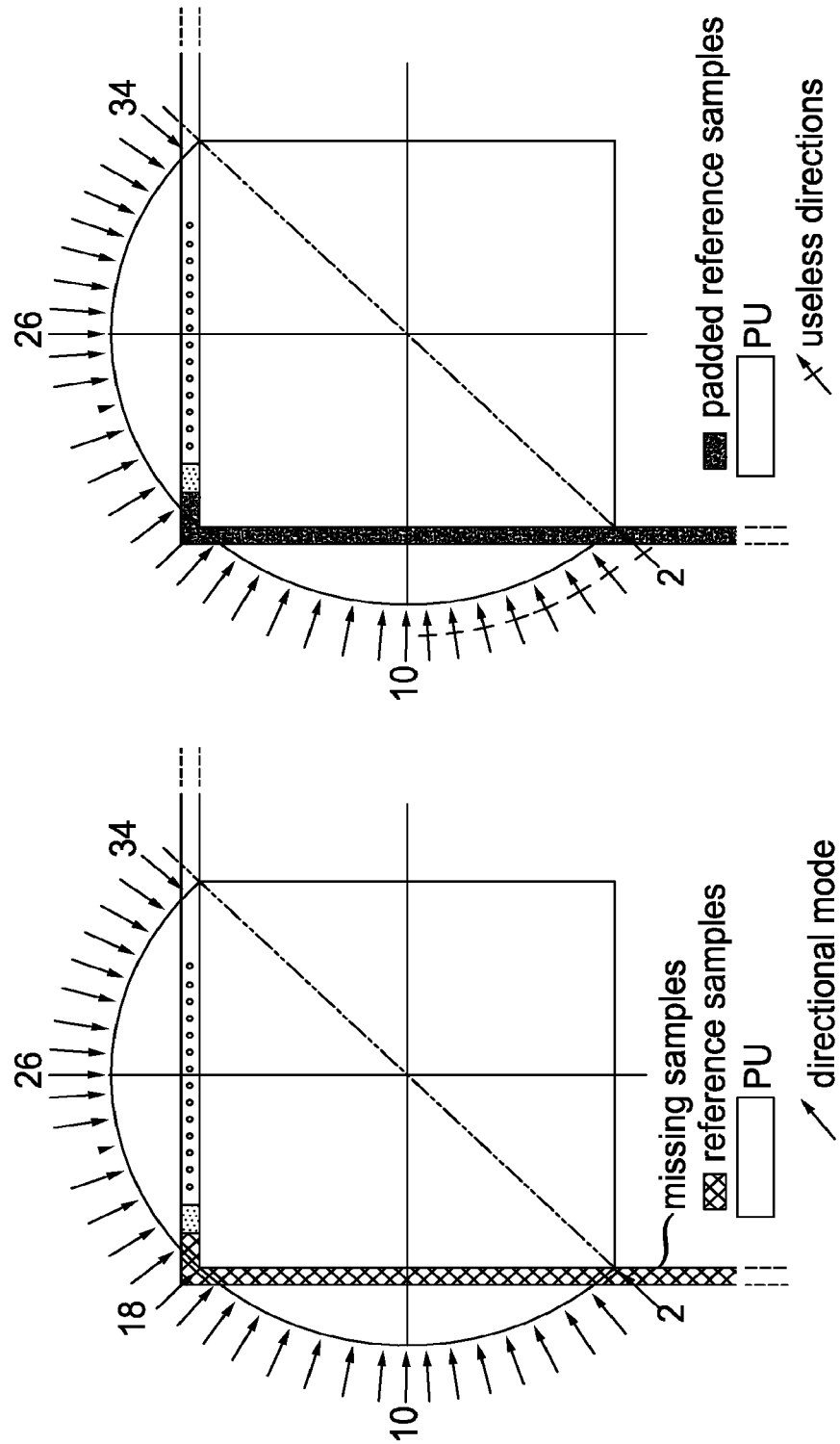
FIG. 1 depicts a current prediction unit (PU) or block in which certain reference samples are missing or unavailable for use in prediction.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION

The subject matter disclosed herein describes a method for improving intra frame prediction in digital video compression when reference samples are missing or unavailable. Although the present invention may at times be described primarily within the context of a particular digital video compression technique, the specific embodiments of the present inventive method should not be treated as limiting the scope of the inventive subject matter. It will be appreciated by those skilled in the art and informed by the teachings herein that the concepts of the present invention can be advantageously applied for improving substantially any intra frame prediction for compression of digital video images.

The terms "reference sample" and "reference pixel" are intended to be used interchangeably without limitation to the meaning. For consistency and ease in understanding, the term "reference sample" will be used almost exclusively in the description below.

As discussed above, it is not unusual for an entire side of reference samples to be missing and therefore unavailable for use as shown on the left side of FIG. 1. All the reference samples on this side have the same value. In this case, all those pixels in the prediction unit are assigned the value of the first reference pixel when scanning the reference pixel L-shape from bottom left to top right, as shown in the right side of FIG. 1. This in turn renders directional modes 2-9 in FIG. 1 to be effectively useless and it weakens the effectiveness and accuracy of the prediction process for the prediction unit.

The accuracy and effectiveness of the intra frame prediction process are improved in accordance with the teachings for the methods disclosed herein because it is possible to recover some intra directional modes that are otherwise rendered useless due to the classical padding process, which was described in relation to FIG. 1. Recovery of some intra directional modes is realized by determining whether, for particular directional mode(s), there exist reference samples available for use along another portion of the prediction unit—the other portion being along the side of the prediction unit at an opposite end of the particular directional mode—and then by replacing the particular directional modes that are rendered useless (because of the unavailability of reference samples) with their counterpart directional modes that are oppositely directed.

It is contemplated that the method can involve initially determining whether reference samples are unavailable or missing for a particular prediction unit or portion thereof given a particular directional mode. In the example of a prediction unit shown in FIG. 1 (as well as in the subsequent figures), this initial determination would identify that reference samples are missing and unavailable all along the left side of the prediction unit. These missing reference samples would be used in the scanning performed along intra directional modes 2-9, for example. But since the reference samples are missing and unavailable, the above-identified directional modes 2-9 are rendered effectively useless thereby undermining the accuracy and effectiveness of the intra frame prediction process.

Figure 2:
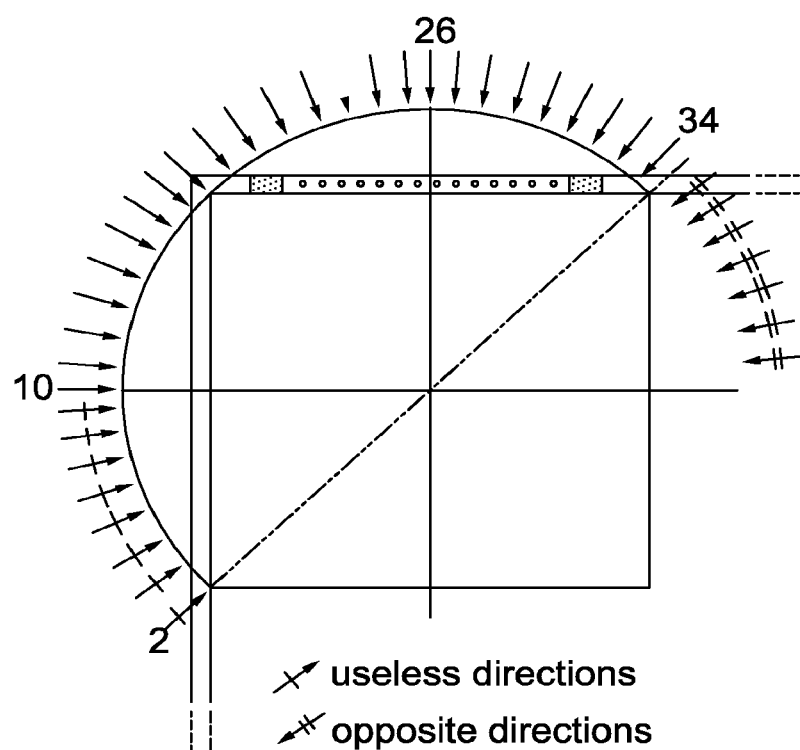
FIGS. 2-6 depict exemplary scenarios showing the presence of useless directional modes and their replacement in accordance with the principles of the present method.
Figure 3:
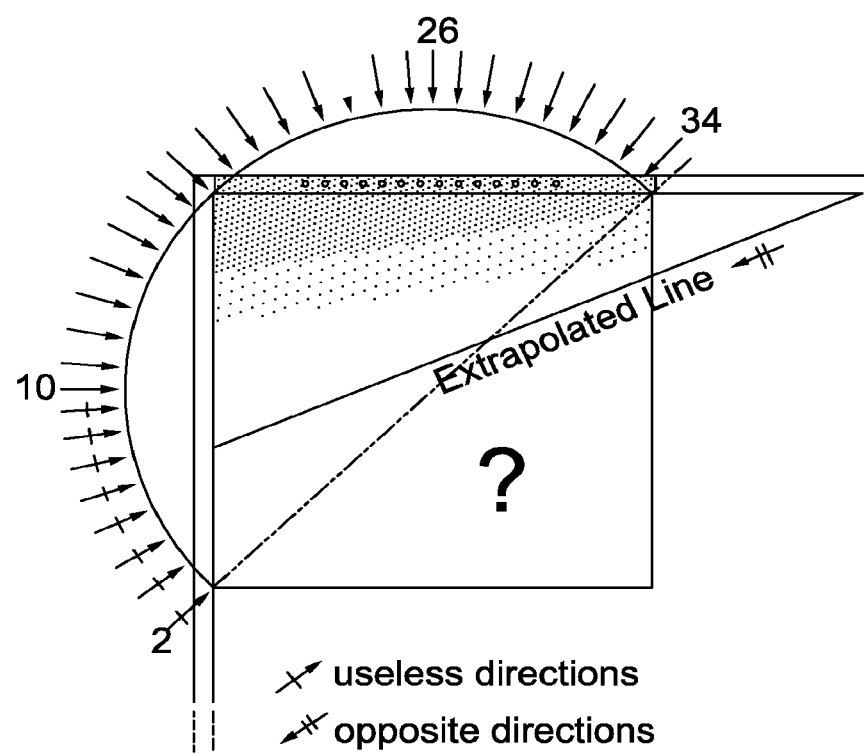

It will be appreciated by persons skilled in the art that the reference sample L-shape shown in the figures along the left side and top portions of the prediction unit, in the case of HEVC, has a size s defined as s=2b+1, where b denotes the size of the current prediction unit. The prediction unit size is generally the same in height and width since prediction units are squares in intra mode. Given these dimensions, it can be appreciated that, contrary to the classical filling techniques in the art, all the pixels of the current prediction unit cannot be filled with accurate reference samples using these directional modes. More generally, even if a large number of reference samples were available on the above left of the prediction unit, some of these new directions shown in FIG. 2 would not be able cover the whole prediction unit with meaningful samples. For example, as shown in FIG. 2 by the solid line across the prediction unit and the left facing arrow on the right of the unit, the oppositely directed mode to directional mode 6 of HEVC will not be able to cover all the pixels for effective prediction, leaving the question-marked area of the prediction unit below the solid sloped line uncovered.

Once it is known that viable reference samples are missing or unavailable, a further determination can be made about whether one or more reference samples are available along another portion of the prediction unit. In particular this determination will be focused on the side of the prediction unit at an opposite end of the particular directional mode. In other words, if the original directional modes had been modes 2-9, this determination will explore the availability of viable reference samples along the top edge of the prediction unit, which samples are said to be located at the opposite or far ends of the directional modes 2-9—it should be understood again that there are no viable reference samples at the near ends of these directional modes.

Figure 4:
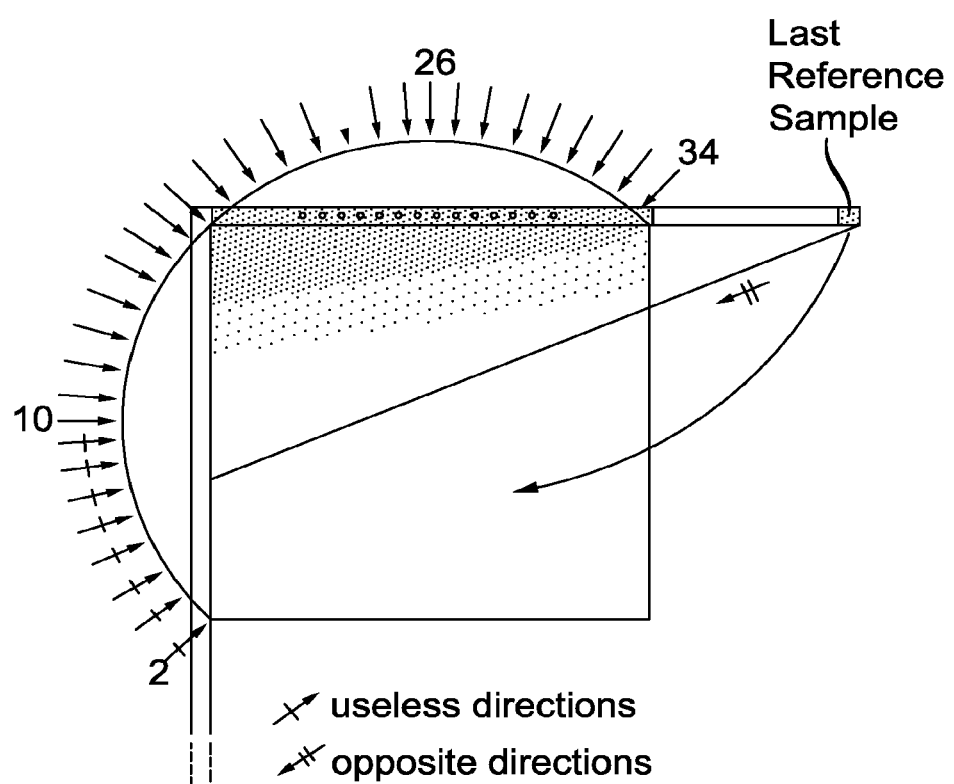

When it is determined that such reference samples are available at the opposite ends of the original directional modes, the method proceeds by extending the number of intra directional modes by replacing the original particular directional modes that are rendered useless, because of the absence or unavailability of reference samples, with their counterpart directional modes that are oppositely directed to the original particular directional modes. In this way, the counterpart directional mode(s) allow the use of the newly determined available reference samples in the intra frame prediction process. As shown in FIG. 4, for example, directional mode 6 is replaced by its oppositely directed counterpart directional mode shown on the right side of the prediction unit. This allows the prediction process to proceed using the reference sample(s) existing along the top edge of the prediction unit.

In this way, the present method improves intra frame prediction over the prior art techniques in those cases where reference samples are missing or unavailable for use and where the best directional mode of propagation for a prediction unit is not covered by classical padding of unavailable samples. The improvement is realized from the use of a better reference sample than the missing or unavailable sample, which is found at the opposite end of the original directional mode.

Several enhancements are contemplated and disclosed below for performing the filling operation the predicted block (i.e., prediction unit) with relevant available sample values.

FIG. 4 shows a prediction unit that has been filled according to the method disclosed above. No reference samples were available for use along the left edge of the prediction unit. In accordance with the principles of the disclosed method, the counterpart directional mode shown on the right side of the unit was substituted for—that is, it replaced—the original directional mode that was rendered effectively useless. An extrapolated solid line parallel to the counterpart directional mode is shown separating the filled area of the prediction unit from the unfilled area of the prediction unit. From experimental practice, it has been found that when all the available reference pixels have been propagated along the considered direction of the counterpart directional mode in the area above the extrapolated solid line, the method can be enhanced by filling the remaining unfilled region with the last reference sample's value. The value of this reference sample is shown as the box at the far end of the extrapolated line bordering the unfilled region. When the prediction unit is completely filled with the available reference sample values, the intra frame prediction process can proceed.

Figure 5:
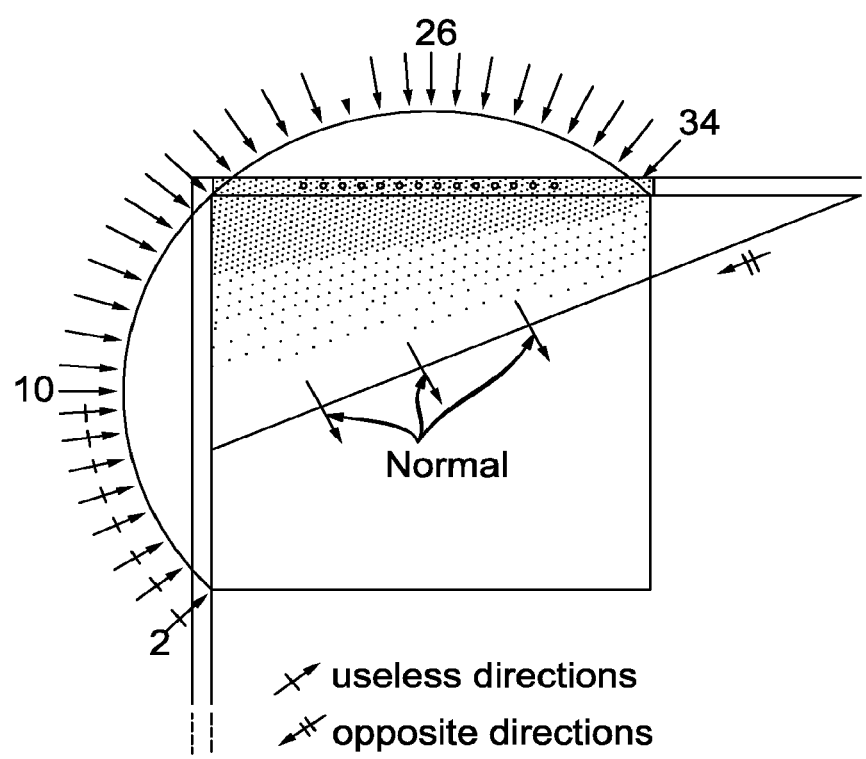

FIG. 5 shows a prediction unit that has been filled according to the method disclosed above. No reference samples were available for use along the left edge of the prediction unit. In accordance with the principles of the disclosed method, the counterpart directional mode shown on the right side of the unit replaced the original directional mode that was rendered effectively useless by the missing reference samples. An extrapolated solid line parallel to the counterpart directional mode is shown separating the filled area of the prediction unit from the unfilled area of the prediction unit. From experimental practice, it has been found that when all the available reference pixels have been propagated along the considered direction of the counterpart directional mode in the area above the extrapolated solid line, the method can be enhanced by filling the remaining unfilled region with sample values that account for the changes in the sample values occurring in a direction normal to the extrapolated line. As shown in FIG. 5, the values being assigned for the pixels in the prediction unit into the area below the extrapolated line are computed reflect the continuous decrease in shading along the directions that are depicted as normal to the extrapolated line. As the area below the extrapolated line is filled, the sample values for the pixels are changed in accordance with the changes observed along the normal directions. Whether the sample values are computed by extrapolation or some other form of modeling, the pixel values below the extrapolated line find their basis in available reference samples. When the prediction unit is completely filled with the available reference sample values, the intra frame prediction process can proceed.

Figure 6:
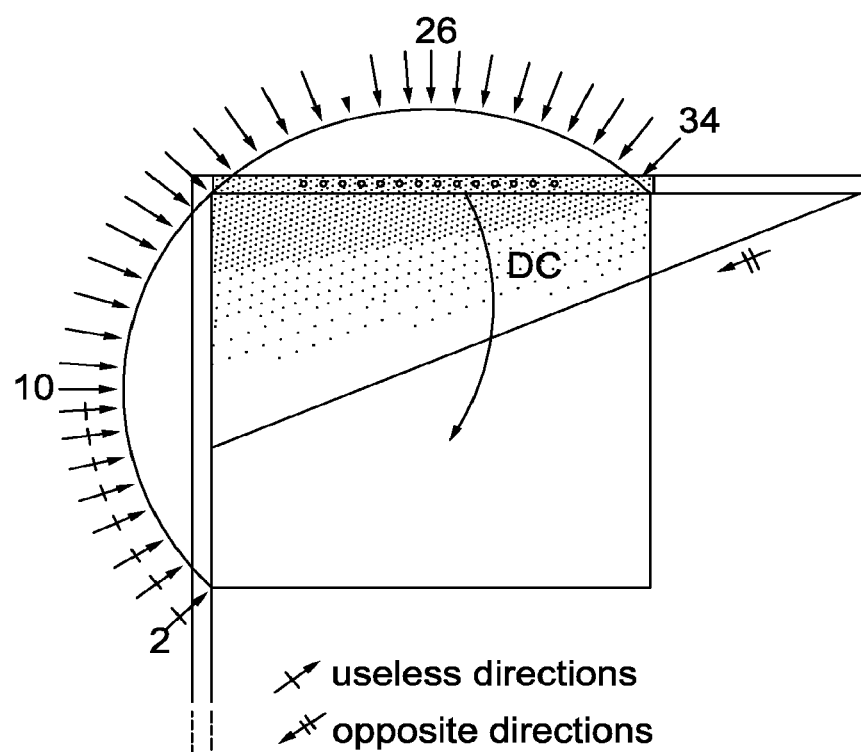

FIG. 6 shows a prediction unit that has been filled according to the method disclosed above. No reference samples were available for use along the left edge of the prediction unit. In accordance with the principles of the disclosed method, the counterpart directional mode shown on the right side of the unit replaced the original directional mode that was rendered effectively useless by the missing reference samples. An extrapolated solid line parallel to the counterpart directional mode is shown separating the filled area of the prediction unit from the unfilled area of the prediction unit. From experimental practice, it has been found that when all the available reference pixels have been propagated along the considered direction of the counterpart directional mode in the area above the extrapolated solid line, the method can be enhanced by filling the remaining unfilled region with the same sample value derived as an average of the available reference samples used in filling the area above the extrapolated line using the counterpart directional mode. This corresponds to using a DC-like mode for the area below the line. When the prediction unit is completely filled with the available reference sample values, the intra frame prediction process can proceed.

Figure 7:
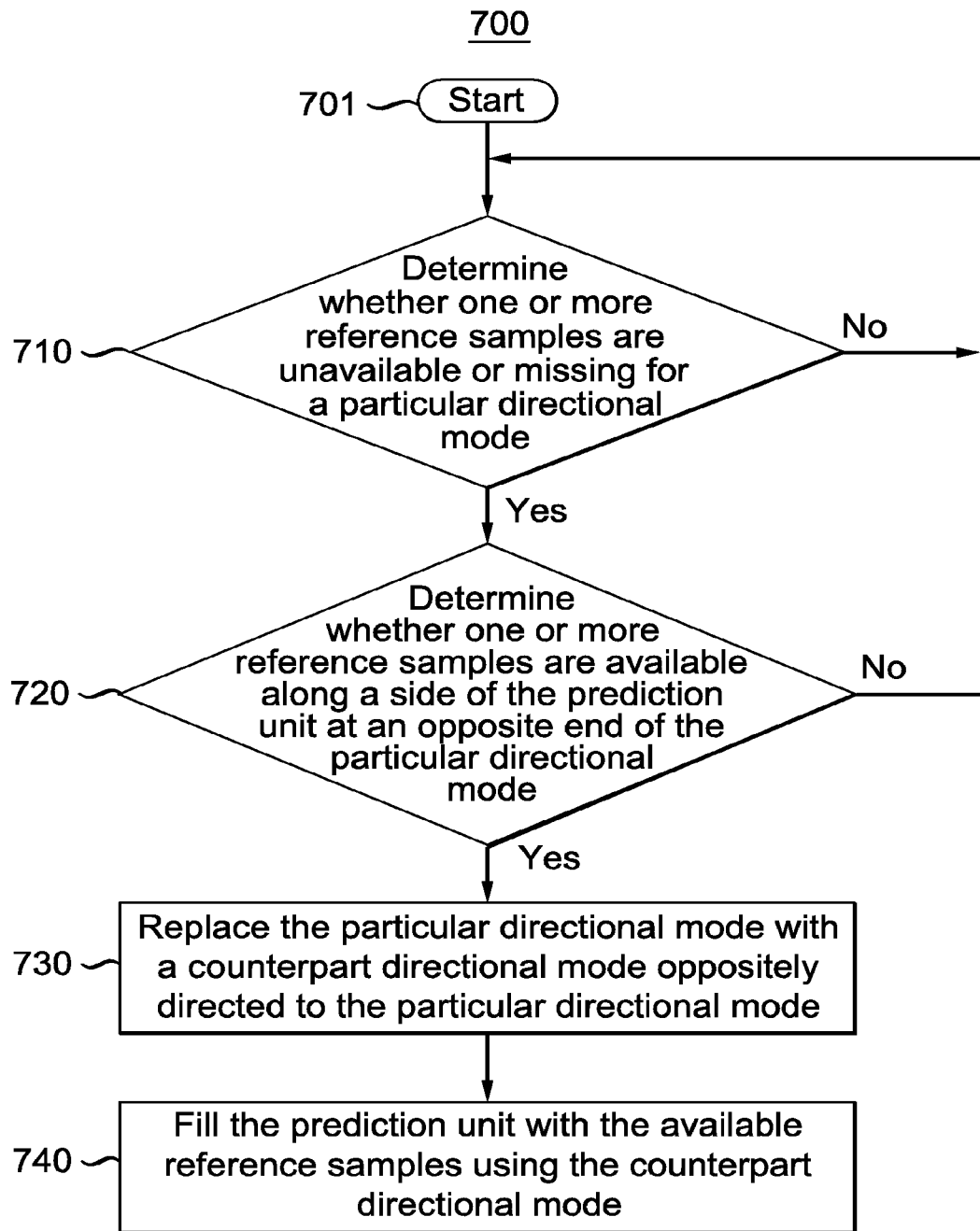
FIG. 7 shows one embodiment of a method for compression of digital video images including an operation for intra frame prediction.

FIG. 7 shows one embodiment of a method 700 for compression of digital video images including an operation for intra frame prediction. The method commences at Start block 701 and proceeds to block 710 for determining whether one or more reference samples are unavailable or missing for a prediction unit or portion thereof given a particular directional mode. If these samples are unavailable, control proceeds to block 720 for determining whether one or more reference samples are available along another portion of the prediction unit, wherein the another portion of the prediction unit is along a side of the prediction unit at an opposite end of the particular directional mode. If these samples are available, control proceeds back to the Start block 701. If, in block 720 it is determined that one or more reference samples are available along another portion of the prediction unit, control proceeds to block 730 for replacing the particular directional mode with a counterpart directional mode that is oppositely directed to the particular directional mode. If it is not determined that one or more reference samples are available along another portion of the prediction unit, control proceeds back to Start block 701. After block 730, control proceeds to block 740 for filling the prediction unit with the available reference samples using the counterpart directional mode.

Figure 8:
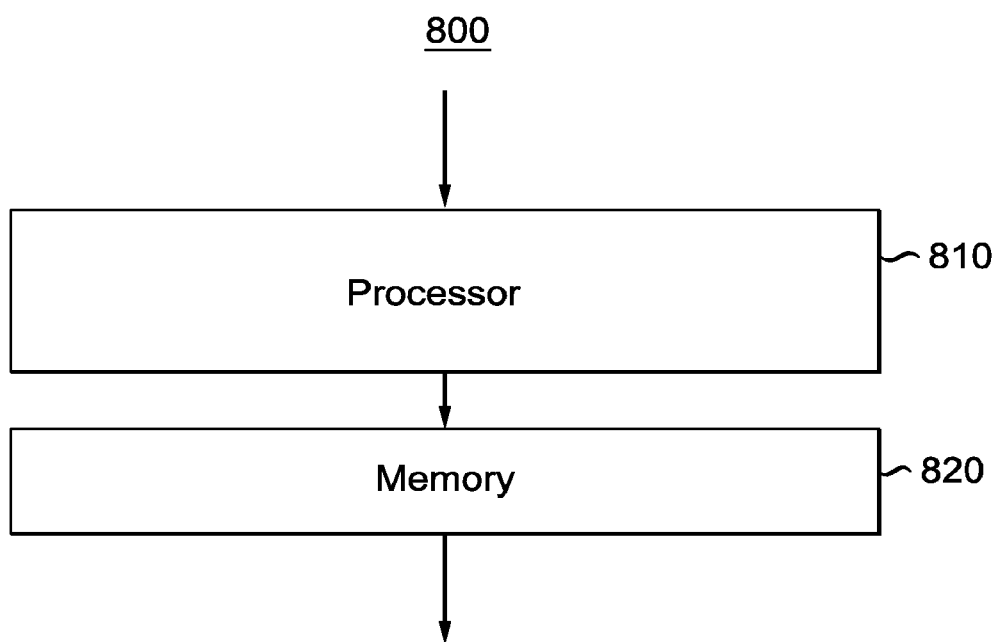
FIG. 8 shows one embodiment of an apparatus for compression of digital video images including an operation for intra frame prediction.

FIG. 8 shows one embodiment of an apparatus 800 for compression of digital video images including an operation for intra frame prediction. Apparatus 800 comprises Processor 810 which receives at least one input comprising video image data and is in signal communication with Memory 820 whose output port may also be available. Processor 810 may also comprise at least one output port. Processor 810 is configured to perform the method of FIG. 7.

It is possible to avoid increased data overhead from an additional syntax or the like by detecting the absence of reference samples on an entire side in order to infer the need to switch from a particular directional mode to its oppositely directed counterpart directional mode.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown.

Having described various embodiments for a method for improving intra frame prediction in digital video compression when reference samples are missing or unavailable, it is noted that modifications and variations of the method can be made by persons skilled in the art in light of the above teachings. It is therefore to be understood that changes may be made in the particular embodiments of the invention disclosed which are within the scope and spirit of the invention. While the forgoing is directed to various embodiments of the present invention, other and further embodiments of the invention may be devised without departing from the basic scope thereof.

We claim:

1. A method for compression of digital video images including an operation for intra frame prediction, each said digital video image including one or more prediction units, said intra frame prediction comprising, for one of said prediction units:

determining whether one or more reference samples are unavailable or missing on a line bordering one edge of said prediction unit or portion thereof given a particular directional mode;

if it is determined that one or more reference samples are unavailable or missing, determining whether one or more reference samples are available on another line bordering another edge of the prediction unit and extending beyond said another edge along a direction of said another line, wherein said another line is at an opposite side of the prediction unit with respect to the particular directional mode;

if it is determined that one or more reference samples are available at said another line, replacing the particular directional mode with a counterpart directional mode that is oppositely directed to the particular directional mode; and filling pixels of the prediction unit with the available reference samples of said another line using the counterpart directional mode, wherein said filling comprises:

when the pixels of one contiguous region of the prediction unit have been filled with all the available reference samples of said another line using the counterpart directional mode, filling the pixels of the prediction unit in an unfilled region of the prediction unit excluding said one contiguous region with a value derived as an average of available reference samples used in filling an area above the another line using the counterpart directional mode.

2. The method defined in claim 1, wherein said filling further comprises:

filling the prediction unit in a region excluding said one contiguous region with a value that is substantially identical to a last reference sample used in the one contiguous region.

3. The method defined in claim 1, wherein said pixels for the unfilled region of the prediction unit are filled:

with calculated values that are determined as a function of change in the pixel values occurring within said contiguous region along a direction normal to the counterpart directional mode.

4. The method defined in claim 1, wherein said pixels for the unfilled region of the prediction unit are filled:

with a same value, which is calculated as an average of the available reference samples of said another line used in filling the one contiguous region.

5. Apparatus for compression of digital video images, each said digital video image including one or more prediction units, the apparatus comprising:

a memory that stores a plurality of instructions; and a processor coupled to the memory and configured to perform said video image compression including an operation for intra frame prediction, said processor being is configured to perform said intra frame prediction, for one of said prediction units by:

determining whether one or more reference samples are unavailable or missing on a line bordering one edge of said prediction unit or portion thereof given a particular directional mode;

if it is determined that one or more reference samples are unavailable or missing, determining whether one or more reference samples are available on another line bordering another edge of the prediction unit and extending beyond said another edge along a direction of said another line, wherein said another line is at an opposite side of the prediction unit with respect to the particular directional mode;

if it is determined that one or more reference samples are available at said another line, replacing the particular directional mode with a counterpart directional mode that is oppositely directed to the particular directional mode; and filling pixels of the prediction unit with the available reference samples of said another line using the counterpart directional mode, wherein said filling comprises:

when the pixels of one contiguous region of the prediction unit have been filled with all the available reference samples of said another line using the counterpart directional mode, filling the pixels of the prediction unit in an unfilled region of the prediction unit excluding said one contiguous region with a value derived as an average of available reference samples used in filling an area above the another line using the counterpart directional mode.

6. The apparatus defined in claim 5, wherein said pixels of the unfilled region of the prediction unit are filled:

with a value that is substantially identical to a last reference sample used in the one contiguous region.

7. The apparatus defined in claim 5, wherein said pixels of the unfilled region of the prediction unit are filled:

with calculated values that are determined as a function of change in the pixel values occurring within said contiguous region along a direction normal to the counterpart directional mode.

8. The apparatus defined in claim 5, wherein said pixels of the unfilled region of the prediction unit are filled:

with a same value, which is calculated as an average of the available reference samples of said another line used in filling the one contiguous region.

9. A nontransitory computer readable medium having one or more executable instructions stored thereon, which when executed by a processor cause the processor to perform a method for compression of digital video images including an operation for intra frame prediction, each said digital video image including one or more prediction units, said intra frame prediction comprising, for one of said prediction units:

determining whether one or more reference samples are unavailable or missing on a line bordering one edge of said prediction unit or portion thereof given a particular directional mode;

if it is determined that one or more reference samples are unavailable or missing, determining whether one or more reference samples are available on another line bordering another edge of the prediction unit and extending beyond said another edge along a direction of said another line, wherein said another line is at an opposite side of the prediction unit with respect to the particular directional mode;

if it is determined that one or more reference samples are available at said another line, replacing the particular directional mode with a counterpart directional mode that is oppositely directed to the particular directional mode; and filling pixels of the prediction unit with the available reference samples of said another line using the counterpart directional mode, wherein said filling comprises:

when the pixels of one contiguous region of the prediction unit have been filled with all the available reference samples of said another line using the counterpart directional mode, filling the pixels of the prediction unit in an unfilled region of the prediction unit excluding said one contiguous region with a value derived as an average of available reference samples used in filling an area above the another line using the counterpart directional mode.

10. The nontransitory computer readable medium in claim 9, wherein said filling further comprises:

filling the prediction unit in a region excluding said one contiguous region with a value that is substantially identical to a last reference sample used in the one contiguous region.

11. The nontransitory computer readable medium in claim 9, wherein said pixels for the unfilled region of the prediction unit are filled:

with calculated values that are determined as a function of change in the pixel values occurring within said contiguous region along a direction normal to the counterpart directional mode.

12. The nontransitory computer readable medium in claim 9, wherein said pixels for the unfilled region of the prediction unit are filled:

with a same value, which is calculated as an average of the available reference samples of said another line used in filling the one contiguous region.

* * * * *